(12) United States Patent
Demenitroux et al.

(10) Patent No.: US 10,727,883 B2
(45) Date of Patent: Jul. 28, 2020

(54) RF AMPLIFICATION DEVICE AND RF TRANSMITTER COMPRISING SUCH A DEVICE

(71) Applicant: THALES, Courbevoie (FR)

(72) Inventors: Wilfried Demenitroux, Cholet (FR); Nicolas Berthou, Cholet (FR); Stéphane Miquel, Gennevilliers (FR); Lucas Mandica, Cholet (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/723,934

(22) Filed: Dec. 20, 2019

(65) Prior Publication Data

US 2020/0212946 A1 Jul. 2, 2020

(30) Foreign Application Priority Data

Dec. 28, 2018 (FR) ..................................... 18 74206

(51) Int. Cl.
*H04B 1/04* (2006.01)
*H04B 1/00* (2006.01)

(52) U.S. Cl.
CPC ......... *H04B 1/0483* (2013.01); *H04B 1/0064* (2013.01); *H04B 2001/045* (2013.01)

(58) Field of Classification Search
CPC ...... H04B 1/04; H04B 1/0485; H04B 1/0064; H04B 1/40; H03F 1/02; H03F 3/193; H03F 3/24; H03F 1/32; H01Q 1/243; H04W 52/0209
See application file for complete search history.

(56) References Cited

U.S. PATENT DOCUMENTS

| | | | |
|---|---|---|---|
| 2010/0097153 A1 | 4/2010 | Rexberg et al. | |
| 2014/0038675 A1* | 2/2014 | Khlat | H04B 1/0067 455/574 |
| 2015/0236652 A1* | 8/2015 | Yang | H03F 3/19 330/251 |
| 2016/0241208 A1* | 8/2016 | Lehtola | H04B 1/40 |
| 2017/0005618 A1 | 1/2017 | Khlat | |
| 2018/0006618 A1* | 1/2018 | Mohta | H04B 1/16 |
| 2018/0159563 A1 | 6/2018 | Khlat et al. | |

FOREIGN PATENT DOCUMENTS

FR 3 020 222 A1 10/2015
WO 2020/016305 A1 1/2020

* cited by examiner

*Primary Examiner* — Thanh C Le
(74) *Attorney, Agent, or Firm* — Baker & Hostetler LLP

(57) ABSTRACT

Operating in a low frequency band and a high frequency band, the device includes at least a first amplification module capable of operating in the high band, the amplification of which is modulated according to a tracking of the envelope of the input signal of the device, capable of being linked at the output to an antenna adapted to the high band; a second amplification module capable of operating in the low band and of performing the envelope tracking; a switch switching the output of the second amplification module to an antenna adapted to the low band, when the amplification device is operating in the low band; to the first amplification module to control the drain voltage of the first module according to the envelope tracking, when the amplification device is operating in the high band.

7 Claims, 2 Drawing Sheets

RF AMPLIFICATION DEVICE AND RF TRANSMITTER COMPRISING SUCH A DEVICE

CROSS-REFERENCE TO RELATED APPLICATIONS

This application claims priority to foreign French patent application No. FR 1874206, filed on Dec. 28, 2018, the disclosure of which is incorporated by reference in its entirety.

FIELD OF THE INVENTION

The present invention relates to an RF amplification device. It relates also to a radio transmitter equipped with such a device.

The field of the invention is notably that of power radio transmitters. The invention applies in particular to all types of communication stations in the HF and VHF frequency ranges for class D for example.

BACKGROUND

The invention addresses in particular the issue of electrical consumption, and therefore the power efficiency of the radiofrequency transmission modules, in particular within the framework of the abovementioned H-V-UHF radio stations.

Typically, a transmission module comprises a logic circuit whose function is notably to transmit the samples describing the baseband digital signal to a digital-analogue converter or DAC. The analogue baseband signal is then transposed to an RF frequency using an IQ modulator, given the integration of digital modulations in software radios. The RF signal is then filtered and amplified in order to optimize the linearity and the gain chain. Finally, for applications involving signals of high levels, the RF signal is amplified by using power stages, such as preamplifiers and power amplifiers, depending on the power wanted at the output of the antenna.

This type of setup presents a number of drawbacks, including:
- a low efficiency of the baseband amplification chain, many watts being lost;
- a complexity of the baseband amplification chain with multiple band filters, each occupying a not-inconsiderable volume;
- a very low efficiency of the communications station for modulations with non-constant envelope, which greatly limits the average power of the station, and therefore its range.

These problems are notably due to the fact that, currently, two radio stations are needed to cover the HF-VHF-UHF needs, one station being dedicated to transmission in the HF band and the other station being dedicated to transmission in the VHF and UHF bands.

Given these conditions, the following needs can be listed for the RF transmission modules:
saving in terms of surface area and volume occupied, reduced production cost;
improved power efficiency over each HF, VHF and UHF sub band compared to that of the current RF stations.

SUMMARY OF THE INVENTION

One aim of the invention is notably to mitigate the abovementioned drawbacks and more particularly to satisfy the needs listed above. To this end, the subject of the invention is a radiofrequency amplification device, said device operating in a low frequency band and a high frequency band and comprising at least:
  a first amplification module capable of operating in said high band, the amplification of which is modulated according to a tracking of the envelope of the input signal of said device, capable of being linked at the output to a first antenna adapted to said high band;
  a second amplification module capable of operating in said low band and of performing said envelope tracking;
  a switch switching the output of said second amplification module:
    to a second antenna adapted to said low band, when said amplification device is operating in said low band;
    to said first amplification module to control the amplification modulation erected by said first module according to said envelope tracking, when said amplification device is operating in said high band, in the case where the amplification is performed by a field-effect transistor, the output of the second amplification module controls the drain voltage of said transistor.

Said second amplification module operates for example in class D.

Said first amplification module operates for example in class AB.

In a particular embodiment, said first amplification module comprises at least:
  a circuit composed of a digital-analogue converter DAC and of a frequency transposition performing the digital-analogue conversion of a band signal into baseband followed by the transposition thereof to the VHF-UHF bands;
  a power amplification stage making it possible to adapt the power of the RF signal at said first antenna and;
  a filter.

Said amplification stage being composed of a field-effect transistor, the drain voltage of said transistor is for example modulated by the output signal of said second amplification module when said switch (3) directs the output of the latter to said first amplification module.

A radiofrequency transmitter equipped with such an amplification device is also a subject of the invention.

BRIEF DESCRIPTION OF THE DRAWINGS

Other features and advantages of the invention will become apparent from the following description, given in light of the attached drawings which represent.

DETAILED DESCRIPTION

Hereinbelow, the following designations will be used:
low band, the transmission frequencies below 100 MHz;
high band, the transmission frequencies above 100 MHz.
Depending on the applications, the limit between the two bands can vary. More generally, the low band therefore corresponds to the frequencies below a given frequency, for example 100 MHz, and the high band corresponds to the frequencies above that given frequency, these low and high bands lying within the frequency range of operation of the RF amplification device and of the RF transmitter.

Figure 1:
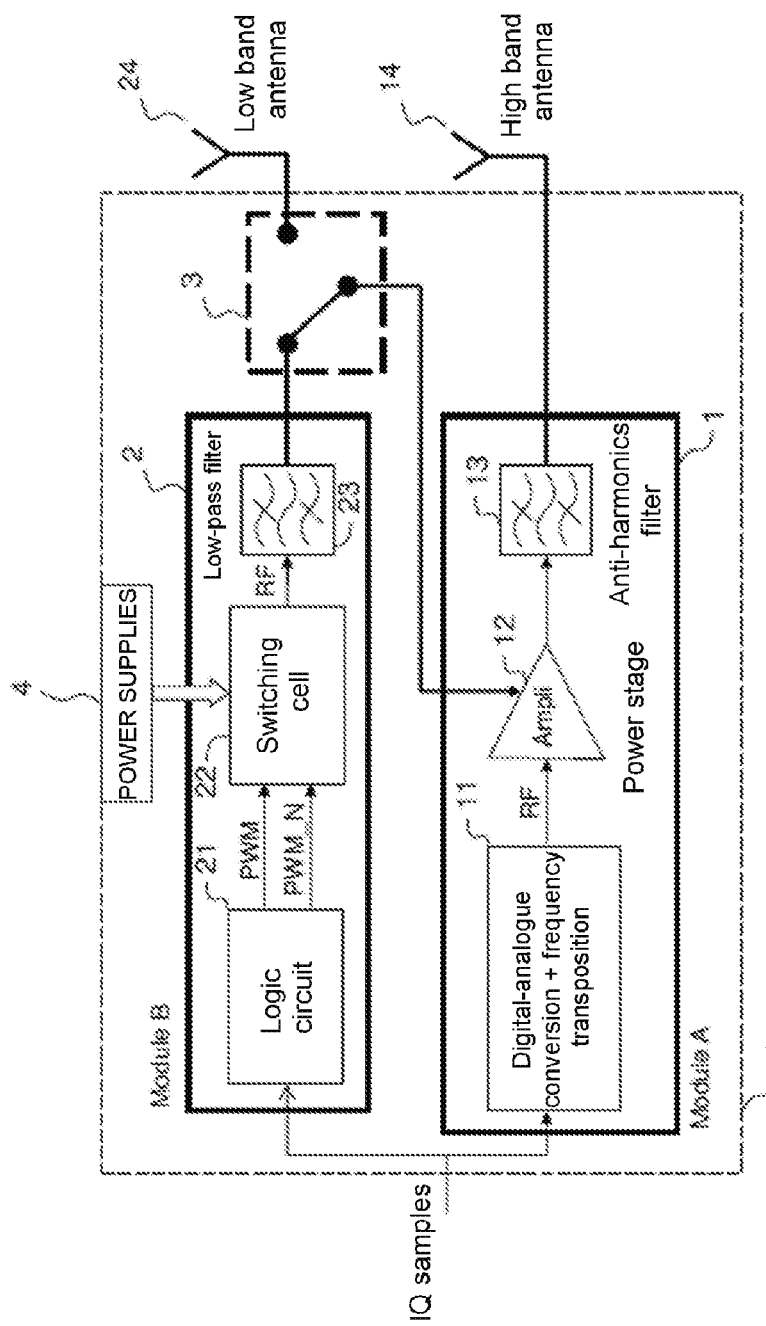
FIG. 1, a block diagram of an amplification device according to the invention.

FIG. 1 presents a block diagram of an amplification device according to the invention.

The solution according to the invention consists in designing a single radiofrequency module, instead of two in the prior art, that can cover transmission in the low band and in the high band.

An amplification device according to the invention 10 comprises at least:
- a first amplification module 1 (module A) adapted for the high band, operating for example in class AB, the amplification thereof being modulated according to a tracking of the envelope of the input signal ("envelope tracking");
- a second amplification module 2 (module B) adapted to operate in the low band, operating for example in class D and performing the envelope tracking function. The envelope tracking function consists notably in performing a dynamic management of the biasing of a radiofrequency amplifier, as a function of the variations of the envelope of the signal to be amplified. Such a transmission module is notably described in the patent application FR 18 00778;
- a power switch 3 making it possible to switch the output of the second module (module B):
    - either to an antenna 24 dedicated to the low band;
    - or to the first module (module A) to the control the biasing thereof according to the envelope tracking.

According to the invention, when the amplifier is operating in the high band, the low band amplification module 2 ensures the envelope tracking function for the high band amplification module 1. When the amplifier is operating in the low band, modulation of the transmitted signal is the modulation specific to the low band amplification module 2.

The input signal RFin of the amplifier 10 is supplied in the form of IQ samples describing this signal. The sampling frequency is a function of the modulation rate and must respect the Nyquist-Shannon criterion. The input signal is common to the two amplification modules 1, 2.

The two amplification modules 1, 2 are now described in more detail.

The first module 1 (module A) is for example produced according to a conventional radiofrequency module architecture. It comprises at least:
- a circuit 11 composed of a digital-analogue converter DAC and of a frequency transposition, for example an IQ modulator, performing the digital-analogue conversion of a band signal into baseband followed by the transposition thereof to the VHF-UHF bands;
- a power amplification stage 12 making it possible to adapt the power of the RF signal at the antenna, this power stage being primarily composed of a power amplifier operating in class AB and;
- a filter 13, whose function in particular is to filter the harmonics.

This first amplification module 1 is connected at the output to an antenna 14 operating in high band.

The second module 2 (module B), an embodiment of which is described in the abovementioned document FR 18 00778, is a radiofrequency RF transmitting architecture performing the class D and "envelope tracking" functions:
- in class D mode, this module 2 is used for transmission for the low band, this class of operation offering performance in terms of efficiency much better than for class AB;
- in "envelope tracking" mode, this module is used to modulate the biasing of the power amplifier 12 of the module (module A), more particularly it is used to modulate the drain voltage of the transistor or transistors of the amplifier 12. That is done to improve the overall efficiency of the first module in the high band. Unlike the current biasing according to the prior art, in which the biasing is fixed therefore the value of the drain voltage is fixed, the envelope tracking technique makes it possible to modulate the drain voltage as a function of the envelope of the input signal RFin to optimize the power efficiency at each instant.

This second amplification module 2 comprises, at the input, a digital circuit generating a signal PWM. The function of this circuit 21, for example in FPGA form, is notably to generate two control signals for a switching cell 22. The two signals generated are complementary:
- a first signal PWM and;
- a second signal PWM_N complementing the first.

The two complementary signals PWM and PWM_N control the switching cell 22. This switching cell 22 is supplied by a power soured 4 (included or not in the amplifier 10) supplying a high voltage $V_{dd1}$ and a low voltage $V_{dd2}$. Depending on the value chosen for these power supplies, the second amplification module is used in class D or in "envelope tracking" mode. An example of switching cell is described in particular in the patent application FR 3 020 222 A1.

At the output of the switching cell 22, the RF signals have a square form. In order to restore the input signal, a low-pass filter 23 is connected at the output of the switching cell. The replicas of the signal around the PWM frequency and the multiples thereof will thus be filtered and only the signal at the desired RF frequency is retained. This filter also performs the input matching of the transistors of the switching cell.

Figure 2:
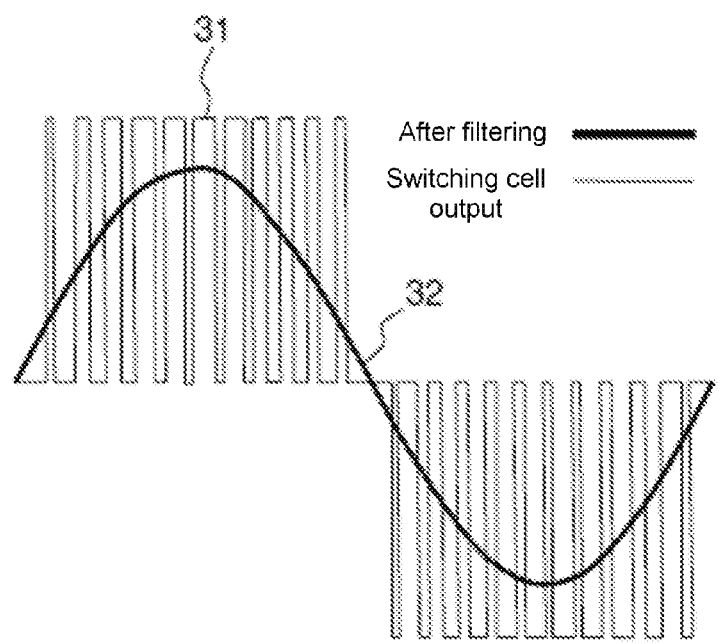
FIG. 2, an illustration of the signals produced in the baseband amplification module of a device according to the invention.

FIG. 2 illustrates, by a curve 31, the signal at the output of the switching cell 22 and, by a curve 32, the signal at the output of the low-pass filter just before the switch 3, the signal of the curve 32 being the output signal of the second amplification module.

Now return to FIG. 2. The input of the power switch 3 is therefore linked to the output of the second modulator. The switch comprises two outputs. A first output is linked to the input of the antenna 24 adapted to the low band, and the other output controls the modulation of the first module 1 for the high band. More specifically, the second output of the switch is linked to the drain of the transistor or transistors of the amplifier 12 of the first amplification module operating in high band.

The operation of the amplification device 10 according to the invention is therefore as follows:
- when it is operating in low band, the switch 3 directs the output of the second amplification module 2 (module B) to the antenna 24, adapted to the low band, the transmitted signal being at the RF frequency desired and modulated according to the IQ complex envelope;
- when it is operating in high band, the switch 3 directs the output of the second amplification module (module B) to the first amplification module (module A), and more specifically to the drain of the amplifier 12; at the antenna 14, adapted to the high band, the transmitted signal is at the RF frequency desired and modulated according to the IQ complex envelope, the drain voltage of the amplifier 12 following the envelope of the modulation by virtue of the envelope tracking technique.

The switch 3 is controlled by a digital circuit, depending on the command applied, the switch directs the output of the second amplification module 2 to one or other of the outputs. The control can be performed in the digital circuit 21 of this second module which receives the input signal frequency information which gives the operating frequency of the amplification device 10.

In principle, the band is not limited, the invention can therefore be applied to all types of amplifiers operating in frequency bands above 30 MHz.

Only the maximum instantaneous band width of the transmission in high band could be limited by the performance of the second modulator (module B, in low band). In other words, the class D capabilities of the second module could limit the performance of the envelope tracking in high band.

The invention advantageously addresses the needs expressed in the introduction. The following advantages can notably be cited:
- drastic improvement in low band efficiency;
- great simplification of the low band power chain;
  - through a drastic reduction of the filtering;
  - through a reduction of the number of amplification stages, a single stage being necessary instead of a multitude thereof in the devices of the prior art;
- the architecture of a device according to the invention is generic and compatible with all RF architecture designs in the field of communications, particularly suited to the current digital radios;
- improved range with modulations with non-constant envelopes, in particular for the high band, the invention makes it possible to use a more powerful amplifier in order to transmit more power in amplitude modulation and in digital modulation.

The invention claimed is:

1. A device for radiofrequency (RF) amplification of an input RF signal, wherein, operating in a low frequency band, corresponding to the frequencies below a given frequency, and a high frequency band, corresponding to the frequencies above said given frequency, it comprises at least:
   - a first amplification module capable of operating in said high band, the amplification of which is modulated according to a tracking of the envelope of said signal at the input of said device, capable of being linked at the output to a first antenna adapted to said high band;
   - a second amplification module, receiving said signal as input, capable of operating in said low band and of performing said envelope tracking; and
   - a switch capable of switching the output of said second amplification module to each of:
     - a second antenna adapted to said low band, when said amplification device is operating in said low band; and
     - said first amplification module to control the amplification effected by said first module according to said envelope tracking, when said amplification device is operating in said high band.

2. The amplification device according to claim 1, wherein said second amplification module operates in class D.

3. The amplification device according to claim 1, wherein said first amplification module operates in class AB.

4. The amplification device according to claim 1, wherein said first amplification module comprises at least:
   - a circuit composed of a digital-analogue converter DAC and of a frequency transposition performing the digital-analogue conversion of a band signal into baseband followed by the transposition thereof to the VHF-UHF bands;
   - a power amplification stage making it possible to adapt the power of the RF signal at said first antenna; and
   - a filter.

5. The amplification device according to claim 4, wherein, said amplification stage being composed of a field-effect transistor, the drain voltage of said transistor is modulated by the output signal of said second amplification module when said switch directs the output of the latter to said first amplification module.

6. A radiofrequency transmitter, wherein it comprises an amplification device according to claim 1.

7. The amplification device according to claim 1, wherein said output of said second amplification module is output from a low pass filter of said second amplification module.

* * * * *